United States Patent [19]

Moore

[11] 3,760,020

[45] Sept. 18, 1973

[54] BIS-(DIALKYLADAMANTYL)BENZENES

[75] Inventor: Robert E. Moore, Wilmington, Del.

[73] Assignee: Sun Oil Company of Pennsylvania, Philadelphia, Pa.

[22] Filed: Sept. 2, 1971

[21] Appl. No.: 177,459

[52] U.S. Cl............................ 260/668 F, 260/666 M
[51] Int. Cl.............................................. C07c 15/12
[58] Field of Search.................... 260/668 R, 668 F, 260/666 M

[56] References Cited
UNITED STATES PATENTS

| 3,342,880 | 9/1967 | Reinhardt | 260/666 M |
|---|---|---|---|
| 3,646,234 | 2/1972 | Moore | 260/666 M |

Primary Examiner—Curtis R. Davis
Attorney—George L. Church et al.

[57] ABSTRACT

Novel compounds of bis-(dialkyladamantyl)benzenes are produced. The compounds are useful as coolants, lubricants and mold release agents.

12 Claims, No Drawings

BIS-(DIALKYLADAMANTYL)BENZENES

BACKGROUND OF THE INVENTION

Adamantane (tricyclo[3.3.1.1$^{3,7}$]decane) has a carbon structure containing ten carbon atoms arranged in a completely symmetrical, strainless manner and is often described as a cage-like structure which consists of three condensed cyclohexane rings. There are four bridgehead carbon atoms which are equivalent to each other as are the rings. The adamantane structure is often depicted by:

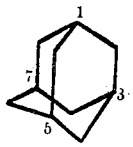

As can be seen, it consists of three condensed cyclohexane rings arranged so that there are four bridgehead carbon atoms customarily designated by the numerals 1,3,5 and 7 respectively which are equivalent to each other.

The preparation of methyl- and/or ethyl-substituted adamantanes by the isomerization of tricyclic naphthenes by means of an aluminum halide or HF-BF$_3$ catalyst has been described in several references including the following: Schneider U.S. Pat. No. 3,128,316; Janoski et al. U.S. Pat. No. 3,275,700; Schleyer et al., Tetrahedron Letters No. 9, pp. 305–309 (1961); and Schneider et al., JACS, vol. 86, pp. 5365–5367 (1964). The isomerization products can have the methyl and/or ethyl groups attached to the adamantane nucleus at either bridge-head or non-bridgehead positions or both, although completion of the isomerization reaction favors bridgehead substitution. Examples of alkyladamantanes made by such isomerization are methyladamantanes, dimethyladamantanes, ethyladamantanes, methylethyladamantanes, dimethylethyladamantanes, trimethyladamantanes and tetramethyladamantanes.

Preparation of adamantane hydrocarbons having higher alkyl groups has been disclosed by Spengler et al. Erdol und Kohle-Erdgas-Petrochemie, vol. 15, pp. 702–707 (1962). These authors used a Wurtz synthesis involving the reaction of 1-bromoadamantane with alkali metal alkyls to interchange the alkyl group for the bromine substituent. In this manner, 1-n-butyladamantane and 1-n-hexyladamantane were prepared.

Hoek et al., 85 (1966) Recueil 1045-1053, have described a different route for the preparation of butyl-substituted adamantane. The procedure involved reacting either 1-bromoadamantane or 2-bromoadamantane with thiophene using SnCl$_4$ as catalyst in the presence of excess thiophene as solvent to produce adamantyl-thiophenes and then hydrogenating the adamantylthiophenes to yield butyl-substituted adamantanes.

Procedures for converting adamantane hydrocarbons to bridgehead hydroxy derivatives (adamantanols) have been described in the prior art. Schneider U.S. Pat. Nos. 3,356,740 and 3,356,741 dated Dec. 5, 1967, disclose the conversion of alkyladamantanes to bridgehead alcohols by air oxidation using a soluble metallic organic salt as catalyst, as also does Schneider U.S. Pat. No. 3,450,775, dated June 17, 1969. Moore U.S. Pat. No. 3,383,424, dated May 14, 1968 shows the oxidation of alkyladamantanes by means of chromic acid in aqueous acetic acid under conditions to produce either monools or diols.

The preparation of non-bridgehead adamantanols containing non-bridgehead alkyl groups from adamantane and their conversion to the corresponding non-bridgehead alkyladamantanes have been described by Landa et al., Collection Czechoslov. Chem Commun.,/ Vol. 32/(1967). Alkyladamantanols in which the hydroxy group is at a non-bridgehead position can be made similarly from keto derivatives of alkyladamantanes which are obtained as by-products of the air oxidation process disclosed in aforementioned Schneider U.S. Pat. No. 3,356,740. Conversion of the keto group can be carried out by a Grignard synthesis in the manner described in the aforesaid Landa et al. reference or by Schleyer et al., JACS, 83, 186, which shows the reaction of adamantanone with methyl iodide and magnesium to yield 2-methyladamantanol-2. In analogous fashion, the keto by-products of U.S. Pat. Nos. 3,356,740 and 3,356,741 can be converted to non-bridgehead alkyladamantanols also having at the non-bridgehead position an ethyl, n-propyl or isopropyl substituent in addition to the alkyl substituents that were present in the starting alkyladamantane hydrocarbon.

Mono- and polyhaloalkyladamantanes can be prepared as disclosed in the following references: Smith and Williams, J. Org. Chem., 26, 2207 (1961); Stetter and Wulff, Chem. Ber., 93, 1366 (1960); Stetter, Angew. Chem., internat. edit., vol. 1, (1962), No. 6, 287-288, German Patent No. 1,101,410, Schneider, U. S. Pat. No. 3,485,880 and Schneider, U. S. Pat. No. 3,577,468.

Mixed haloalkyladamantanes like bromochloroadamantane may be prepared according to copending application of Driscoll and Moore, Ser. No. 688,679, filed Dec. 7, 1967.

The halohydroxyalkyladamantane derivatives can be prepared according to the procedure set forth in copending application of Driscoll and Moore, Ser. No. 784,480, filed Dec. 17, 1968.

SUMMARY OF THE INVENTION

The invention embraces as new compounds, bis-(alkyladamantyl)benzenes having the formula:

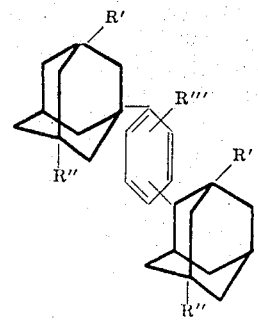

where R' and R'' are hydrocarbon radicals and R''' is an aliphatic radical having zero to eight carbon atoms. These compounds have high thermal stabilities and have utility as special coolants, lubricants and mold release agents.

DESCRIPTION OF THE PREFERRED EMBODIMENTS

The bis(alkyladamantyl)benzene compounds of the invention can be prepared from the corresponding alkyladamantanols or haloalkyladamantanes. A preferred procedure comprises reacting the hydroxyalkyladamantane or haloalkyladamantane and benzene or a benzene having one or more alkyl substituents in the presence of sulfuric acid or polyphosphoric acid or fluorosulfonic acid (HFSO$_3$) or a Lewis acid catalyst.

The relative proportions in which the starting materials may be used can vary within the scope of the invention, depending to some extent upon the particular materials used and specific operating conditions employed. Thus, the mole ratio of alkyladamantanol or haloadamantane to the benzene compound may vary from about 1:1 to 5:1, but preferably from 1:1 to 3:1. The reaction is carried out in a suitable inert solvent which will preferably retain the reactants in solution. Suitable solvents include the saturated hydrocarbons such as the n-paraffins, e.g., hexane, heptane, etc. Reaction temperatures are relatively low, i.e., 10° to 100°C. but preferably between 10°–40°C. The operating pressures may be subatmospheric, atmospheric or superatomospheric. Generally the pressure employed is sufficient to maintain at least a substantial part of the reaction medium in the liquid phase.

In affecting the reaction with sulfuric acids, the strength of the starting acid should be in the range of 75–99 percent H$_2$SO$_4$ equivalent by weight. Polyphosphoric acid and fluorosulfonic acid do not have oxidizing potentials as great as sulfuric acid; therefore, concentrations of these acids are not critical. Well known Lewis acid catalysts such as HF, HF-BF$_3$, BF$_3$ and mixtures thereof can also be employed when using haloalkyladamantanes as starting materials.

The alkyladamantanols and haloalkyladamantanes are well known and their preparation is adequately described in the patents and literature mentioned before. Any monool, diol, halo, polyhalo or mixed halohydroxy derivatives of an adamantane hydrocarbon having 1–3 alkyl or cycloalkyl substituents may be useful as reactants in this invention. Although the number of carbon radicals in each substituent R' and R'' radical can range up to 20, it is generally preferred that each R' and R'' contain no more than 10 carbon atoms and most preferred are methyl and ethyl groups. The alkyl, hydroxyl, or halo substituents can be located at either bridgehead or non-bridgehead positions. Substantially the same results will be obtained regardless of the original position of the OH or halo radical on the nucleus, inasmuch as immediate isomerization of the OH or halo to an unsubstituted bridgehead position on the nucleus occurs in the presence of the strong acid conditions used in the process. Some suitable alkyladamantanols are 3-methyl-1-adamantanol, 3-ethyl-1-adamantanol, 3,5-dimethyl-1-adamantanol, 3-methyl-5-ethyl-1-adamantanol, 3,5,7-trimethyl-1-adamantanol, 3,5-dimethyl-7-ethyl-1-adamantanol and the like. Suitable haloalkyladamantanes or halohydroxyalkyladamantanes are the bromo, chloro, bromochloro, bromohydroxy, chlorohydroxy derivatives of the following hydrocarbons: 1-methyl or 2-methyladamantane; 1-ethyl or 2-ethyladamantane; 1,2-dimethyl or 1,3-dimethyladamantane; 1-methyl-3-ethyl-adamantane; di-ethyladamantane; 1-n-propyl or 1-isopropyladamantane; 1-n-butyladamantane; 1,3-di-n-pentyladamantane; 1-methyl-3-heptyladamantane; 1-n-decyladamantane, 1-n-decyl-3-ethyl-adamantane; 1-methyl-2-propyladamantane; 1-isohexyl-adamantane and the like.

The benzene compound can be benzene or an alkyl benzene having 1 or 2 alkyl or cycloalkyl groups having 1-20 carbon atoms attached at ortho, meta or para positions. Some suitable benzene compounds are benzene, toluene, xylene, ethylbenzene, n-propylbenzene, cumene, n-butylbenzene, isobutylbenzene, sic-butylbenzene, t-butylbenzene, p-cymene, o-ethyltoluene, m-ethylisopropylbenzene, 2-methyl-3-phenyl-pentane, cyclohexylbenzene and the like.

EXAMPLE I

Preparation of bis(3,5-dimethyl-1-adamantyl)benzene

To 20 cc. of 15% sulfuric acid (96% H$_2$SO$_4$ equivalent) 1.8 grams 3,5-dimethyl-1-adamantanol (0.01 mole) was added with stirring. To the resulting solution, 10 cc. n-hexane (99 mole %) and 0.8 grams benzene (0.01 mole) were added slowly with good agitation. The resulting mixture was stirred vigorously for 3 hours at 10°–15°C. The hexane layer was separated, dried and evaporated leaving an oily residue which crystallized upon standing. The solid was recrystallized with ethyl ether and had a melting point 124.5°–125.8°C. The structure was identified by the application of standard techniques of infrared, nuclear magnetic resonance and mass spectrography as

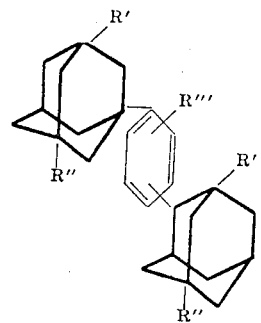

| Elemental Analysis | Calculated | Found |
|---|---|---|
| Carbon | 89.45 | 89.60 |
| Hydrogen | 10.55 | 10.42 |

The invention claimed is:

1. A bis-(dialkyladamantyl)benzene compound having the structure:

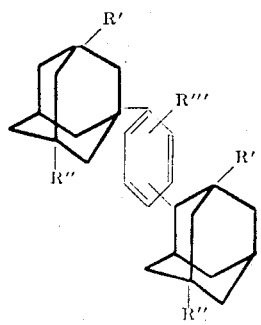

where R' and R'' are hydrocarbyl radicals having one to 20 carbon atoms which may be either on bridgehead or non-bridgehead positions and R''' is an aliphatic radical having one to 20 carbon atoms or hydrogen.

2. A compound according to claim 1 wherein R' and R'' have 1-10 carbon atoms.

3. A compound according to claim 1 wherein the hdyrocarbyl radical is independently selected from the group consisting of alkyl and cycloalkyl.

4. A compound according to claim 1 wherein R' and R'' are methyl or ethyl.

5. A compound according to claim 1 wherein R' and R'' are methyl.

6. A compound according to claim 1 wherein R''' is hydrogen.

7. A process for preparing a compound according to claim 1 which comprises reacting an adamantane compound selected from the group consisting of alkyladamantanol and haloalkyladamantane and a benzene compound selected from the group consisting of benzene or alkylbenzene in contact with a catalyst selected from the group consisting of sulfuric acid, polyphosphoric acid, fluorosulfonic HF, HF—BF$_3$, and BF$_3$.

8. A process for preparing a compound according to claim 1 which comprises reacting an adamantanol of the structure:

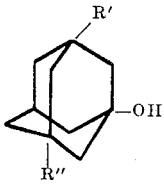

with a benzene compound of the structure

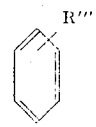

where R' and R'' are hydrocarbyl radicals having one to 20 carbon atoms which may be bridgehead or non-bridgehead and R''' is an aliphatic radical having one to 20 carbon atoms or hydrogen in the contact with sulfuric acid.

9. A process according to claim 7 wherein the temperature is the range of −10° to 40°C.

10. A process according to claim 7 wherein the R' and R'' have one to 10 carbon atoms.

11. A process according to claim 7 wherein R' and R'' are methyl or ethyl and R''' is hydrogen.

12. Bis-(3,5-dimethyl-1-adamantyl)benzene.

* * * * *